United States Patent [19]
Stanchus

[11] Patent Number: 5,899,593
[45] Date of Patent: May 4, 1999

[54] PHOTOGRAPHIC CAMERA HAVING AUTOMATIC RESET OF AN OPERATION UPON UNLOADING OF A FILM CARTRIDGE

[75] Inventor: Robert J. Stanchus, Rochester, N.Y.

[73] Assignee: Eastman Kodak Company, Rochester, N.Y.

[21] Appl. No.: 08/957,726

[22] Filed: Oct. 24, 1997

[51] Int. Cl.⁶ ................................................. G03B 17/02
[52] U.S. Cl. ............................................................ 396/538
[58] Field of Search ................................... 396/511, 512, 396/516, 535, 538; 242/348

[56] References Cited

U.S. PATENT DOCUMENTS 5,155,514  10/1992  Tamamura .
5,430,515   7/1995  Lawther et al. .
5,526,084   6/1996  Kataoka et al. ..................... 396/538 X

*Primary Examiner*—Safet Metjahic
*Assistant Examiner*—J. K. Han
*Attorney, Agent, or Firm*—Peyton C. Watkins

[57] ABSTRACT

A camera for use with a film cartridge which camera automatically resets a camera operation upon unloading of the film cartridge, the camera includes a camera body for forming a protective enclosure. A retainer is disposed in the camera body that moves to a passive first position upon loading of the film cartridge for permitting the film cartridge to be loaded in the camera body, and that moves to a second active position for engaging the film cartridge upon unloading of the film cartridge that permits partial unloading and prevent full unloading. A logic element is received by the camera body and includes a first state that activates the camera operation and a second state that resets the camera operation. An activation operator is manually engaged for moving the logic element to the activation position, and that either engages or disengages the retainer upon unloading of the film cartridge, which engagement or disengagement consequently causes the operator to move the logic element to the reset position.

6 Claims, 4 Drawing Sheets

PHOTOGRAPHIC CAMERA HAVING AUTOMATIC RESET OF AN OPERATION UPON UNLOADING OF A FILM CARTRIDGE

FIELD OF THE INVENTION

The invention relates generally to the field of photographic cameras for use with a film cartridge, and more particularly, to such cameras having an automatic reset of a camera operation activated upon loading and/or unloading the film cartridge.

BACKGROUND OF THE INVENTION

In conventional cameras, a film cartridge is loaded into a loading chamber. Film in the film cartridge is manually or automatically loaded into the camera. Images are then recorded on the film after which the film is rewound into the film cartridge. A door covering the loading chamber is opened and the film cartridge is removed so that the film can be processed.

In traditional 35 mm cameras, the film cartridge is loaded into the loading chamber in a direction perpendicular to the cartridge spool. More recently, cameras have been developed in which the film cartridge is loaded in a direction parallel to the cartridge spool or end first. Such a camera is disclosed in U.S. Pat. No. 5,155,514.

In U.S. Pat. No. 5,155,514, a film cartridge is pushed down into a loading chamber. By pushing the cartridge into the chamber, an end of the cartridge contacts a sloped face of a lock lever, causing the lock lever to be moved to the right. The cartridge is pushed into the chamber against a spring. Once the cartridge is completely in the chamber, a spring forces the lock lever to the left, thereby retaining the cartridge in the chamber against the force of the spring. A cover member is then moved to the left to cover the loading chamber.

When it is desired to remove the film from the loading chamber, the cover member is moved to the right against a spring. The movement of the cover member causes the lock lever to move to the right against the spring. When the lock lever is moved far enough to the right, a portion of the lock lever disengages the upper surface of the cartridge, allowing the cartridge to move out of the loading chamber under the influence of the spring.

A problem with the mechanism in the above-described patent is that when the lock lever is moved to the right, releasing the cartridge, there is nothing further to prevent the cartridge from moving out of the loading chamber. If the camera is oriented so that the loading chamber is in a near horizontal position or upside-down, the film cartridge may be ejected completely out of the loading chamber by the spring. If the operator is not prepared to catch the ejected film cartridge, the cartridge may fall and strike a hard surface, thereby becoming damaged and possibly ruining the film contained therein.

Commonly assigned U.S. Pat. No. 5,430,515 overcomes this problem by including a retainer the engages the film cartridge upon unloading of the film cartridge so that partial unloading is achieved and full unloading is prevented. Once in the partially unloaded position, the film cartridge is manually engaged by the user for exerting enough force to overcome the bias of the retainer for permitting the film cartridge to be totally unloaded.

Although the presently known and utilized systems for unloading the film cartridges are satisfactory, it is always desirable to combine camera features for simplicity and efficiency. More specifically, the prior art cameras do not link the unloading of the film with other camera features for automatically performing an operation that is needed upon loading and/or unloading of the film.

Consequently, a need exists for a camera overcoming the above-described drawbacks.

SUMMARY OF THE INVENTION

The present invention is directed to overcoming one or more of the problems set forth above. Briefly summarized, according to one aspect of the present invention, the invention resides in a camera for use with a film cartridge which camera automatically resets a camera operation upon unloading of the film cartridge, the camera comprising: (a) a camera body for forming a protective enclosure; (b) a retainer disposed in said camera body that moves to a passive first position upon loading of the film cartridge for permitting the film cartridge to be loaded in said camera body, and that moves to a second active position for engaging the film cartridge upon unloading of the film cartridge that permits partial unloading and prevent full unloading; (c) a logic element received by said camera body having a first state that activates the camera operation and a second state that resets the camera operation; and (d) an activation device for moving said logic element to the activation position, and that either engages or disengages said retainer upon unloading of the film cartridge, which engagement or disengagement consequently causes said operator to move said logic element to the reset position.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of linking the film cartridge retainer to a device that automatically senses via the retainer the total ejection and/or insertion of the film cartridge for resetting one or more camera functions.

DETAILED DESCRIPTION OF THE INVENTION

The invention is disclosed as being embodied preferably in a still photographic camera. Because the features of this type of camera are generally well known, the description which follows is directed in particular to elements forming part of or cooperating directly with the disclosed embodiment. It is to be understood, however, that other elements not specifically shown or described may take various forms known to persons ordinarily skilled in the art.

Also in the following description, it is to be understood that such terms as "forward," "rearward," "left," "right," "upwardly," "downwardly," and the like are words of convenience and are not to be constructed as limiting terms.

Figure 1:
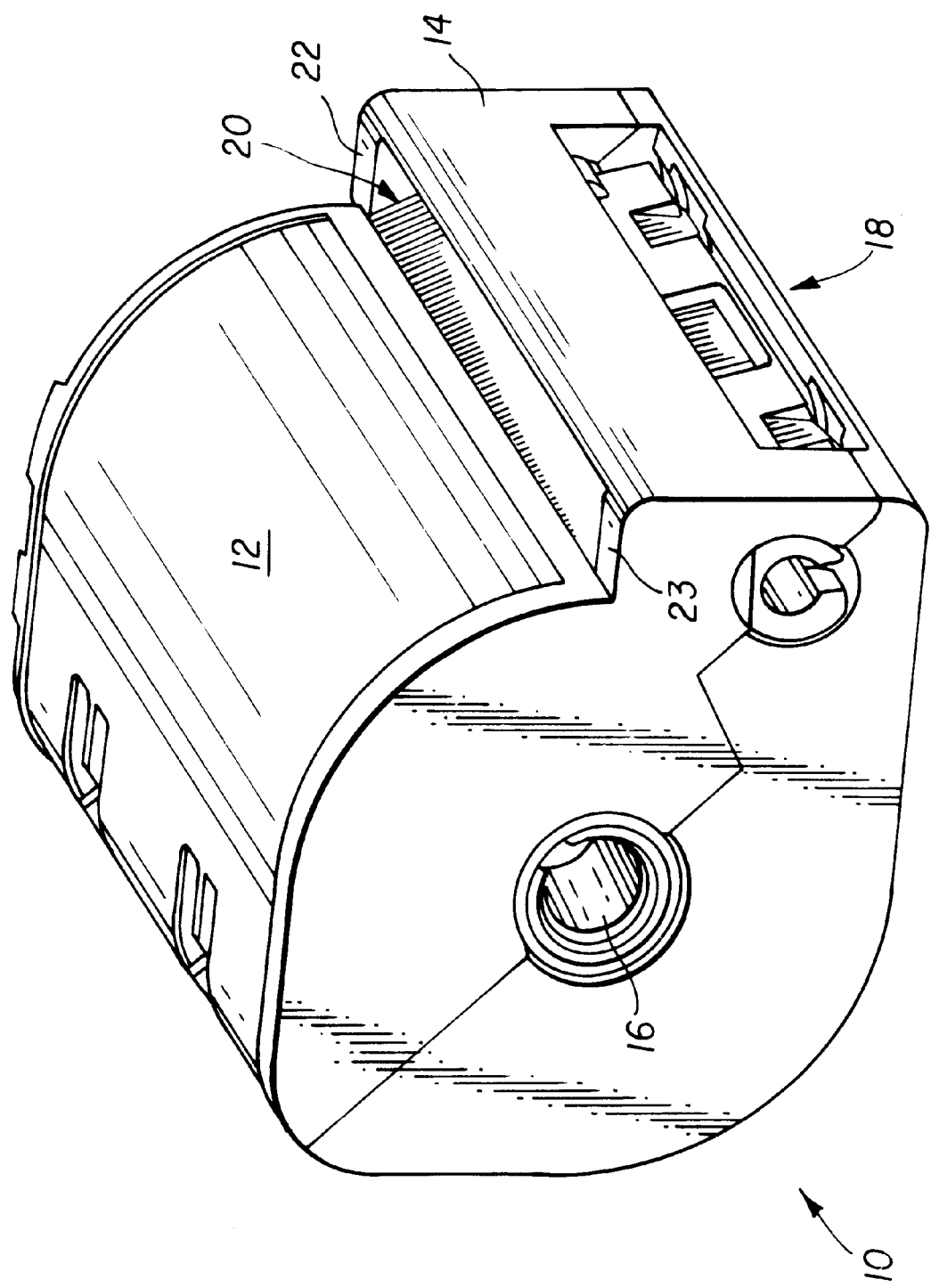
FIG. 1 is a perspective view of a film cassette for use with a camera of the present invention.

Referring now to the drawings, FIG. 1 shows a film cartridge generally designated by the reference numeral 10. The film cartridge is preferably made of a material such as plastic and includes a housing 12 having a lip 14. A spool 16 is rotatably mounted inside the housing. Wrapped on the spool is a photographic filmstrip (not shown) which can be thrust through an opening 18 in the lip 14. A groove 20 is located on an inner surface of the lip 14, and an inclined or lip portion 22 and 23 is positioned on each end of the groove 20. The groove 20 is preferably parallel with spool 16 and extends a substantial portion of the length of lip 14.

Figure 2:
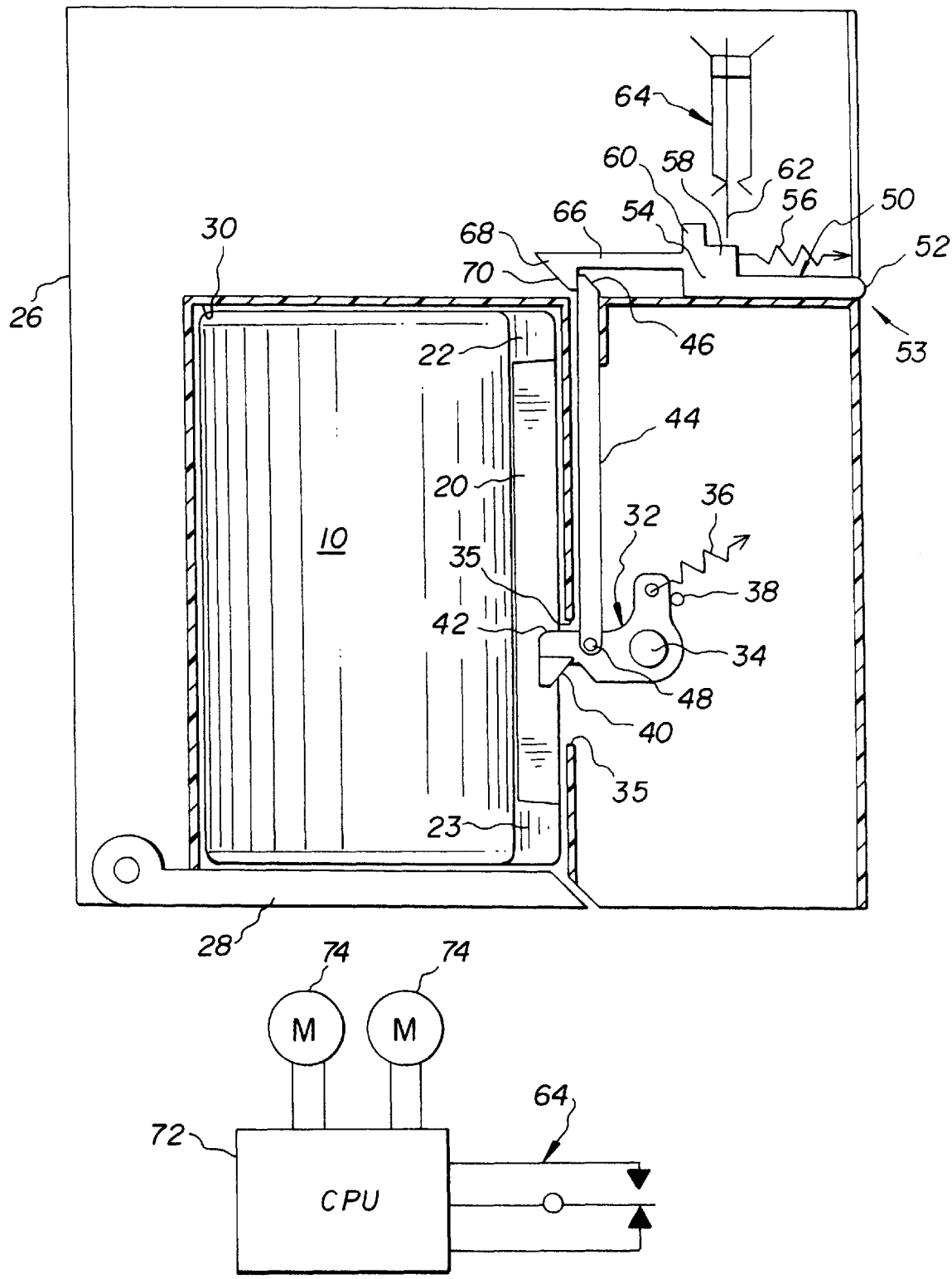
FIG. 2 is a view in horizontal cross section of a camera of the present invention.
Figure 3:
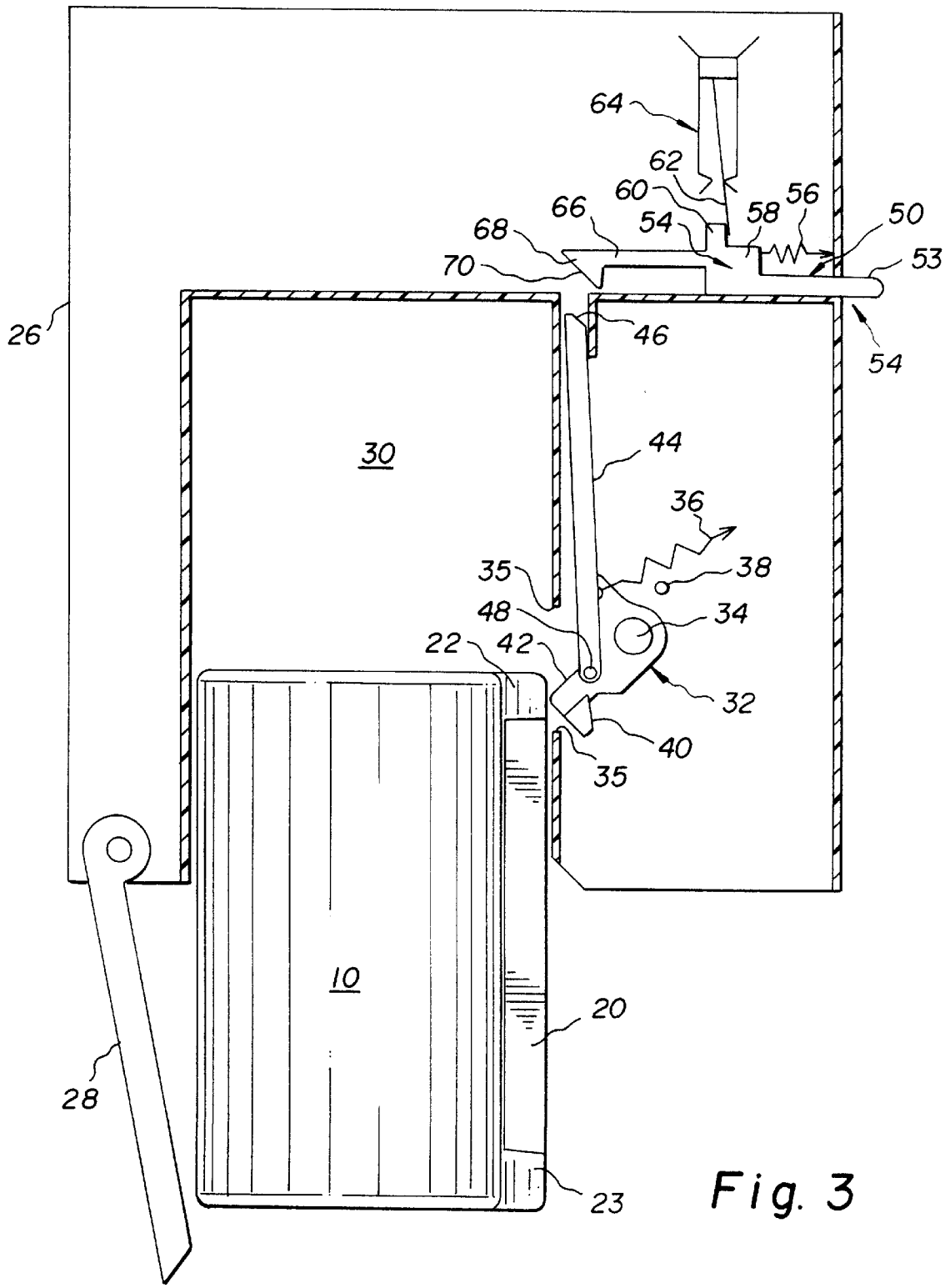
FIG. 3 is a also a view in horizontal cross section of the camera of the present invention.

Referring now to FIGS. 2 and 3, there is illustrated one embodiment of a camera 24 of the present invention. In this regard, a camera body 26 includes a movable hinged door 28 at its bottom portion for permitting access to a hollowed-out cartridge chamber 30 that receives the film cartridge 10. A pivotable, pliable retainer 32 is attached to an interior portion of the camera body 26 by a pin 34 that permits the retainer 32 to pivot thereabout. The chamber 30 includes a notched-out portion 35 in its wall for permitting the retainer 32 to pivot out of the chamber 30. A spring 36 is also attached to the retainer 32 for biasing the retainer 32 in the position shown in FIG. 2. A stop 38 is attached to the camera body 26 for maintaining the retainer 32 in the position of FIG. 2 when biased by the spring 36.

The retainer 32 includes an outwardly extending leading end portion 40 that projects outwardly and away from the film cartridge 10 for permitting the film cartridge 10 to pass uninhibited under the leading end portion 40. The retainer 32 also includes a trailing end portion 42 that is pliable enough so that it bends or flexes when contacted by the lip portion 22 of the film cartridge 10 upon insertion of the cartridge 10 into the film chamber 30.

An arm 44 having a beveled end portion 46 is attached to the retainer 32 via a pin 48 for providing structural coupling between the retainer 32 and a manually depressable activation button or operator 50. The pin 48 is mounted to the interior of the camera body 26. The activation button 50 includes an elongated end portion 52 that projects through a hole 53 in the camera body 26, which end portion 52 the user depresses for activation of one or more camera operations. The button 50 also includes a stepped or two-tiered middle portion 54. A spring 56 is attached to a side of one of the tiers 58 at one end and to the interior of the camera body 26 at its other end for biasing the button 50 inwardly toward the spring 56; the position shown in FIG. 3 (i.e., the reset or deactivated position). The other tier 60, when the button is biased as in FIG. 3, contacts a lever 62 of an electrical switch 64 for maintaining the switch 64 in the position illustrated in FIG. 3. When the button 50 is depressed, the tier 60 moves out of contact with the lever 62 for permitting the lever 62 to automatically spring back to the position in FIG. 2 (i.e., the activation position). The other end of the button 66 includes a latch portion 68 that latches onto the arm 44, when the camera 24 is in the activation position, for maintaining the button 50 in the activation position until reset. As is obvious to those skilled in the art, the spring 56 exerts an inwardly force of the button 50 that drives the latch portion 68 against the arm 44 for maintaining the button 50 in the activation position. The latch portion 68 also includes a beveled edge 70 that contacts the beveled portion 46 of the arm 44 when the button 50 is depressed for pushing the arm 44 downwardly so that it passes over the arm 44. The arm 44 then engages the latch portion 68 for maintaining it in the activation position when the user releases the button 50.

Referring to the schematic of FIG. 2, the switch 64 is connected to a central processing unit (CPU) 72 disposed in the camera 24 for detecting the mode or position of the switch 64. When the switch 64 is the activation mode, the CPU 72, which is electrically connected to a plurality of motors 74, sends a signal to one or more of the motors 74 to activate one or more camera operations, such as rewind of the film in the cartridge, advancing a film counter or similar functions. These operations and their associated devices are well known in the art and are not discussed herein. As is obvious to those skilled in the art, the motors 70 automatically stop the operation when the operation is completed.

The operation of the camera is as follows, and will be described using a reset operation for purposes of illustration, although any camera operation may be substituted therefor or a plurality of operations may be simultaneously performed. However, before describing the operation in detail, a brief summary of the normal positions (reset position) of the camera is beneficial. Referring to FIG. 2, the retainer 32 is biased by the spring 36 against the stop 38 and the latch portion 68 is biased inwardly and disengaged from the arm 44 (the position in FIG. 3). The button 50 presses against the lever 62 for maintaining it in the reset position (the position of FIG. 3). Turning now to the camera operation, the door 28 is opened and a film cartridge 10 is inserted into the chamber 30. The cartridge 10 passes under the end portion 40 of the retainer 32 and bends the end portion 42 of the retainer 32 so that the retainer 32 does not inhibit the insertion of the cartridge 10. The door 28 is then closed and images are captured on the film as is well known in the art.

Upon completion of the image capture process, the rewind button 50 is depressed and the beveled edge 70 of latch portion 68 of the button 50 contacts the arm beveled edge 46. The force of the latch portion 68 overcomes the biasing of the arm 44 upwardly by the spring 36 so that the arm 50 is temporarily forced downwardly for permitting the latch portion 68 to pass over the arm 44. The arm 44 is urged back to its original upwardly position when the latch portion 68 passes thereover.

When the latch portion 68 passes over the arm 44, the user senses less resistance and releases the button 50. The spring 56 then urges the latch portion 68 inwardly against the arm 44 which maintains the button 50 in the position of FIG. 3. As will be readily apparent to those skilled in the art, the lever 62 automatically moves to the reset position once the button 50 is depressed for initiating the rewind operation. Once the rewind operation is complete, the user preferably holds the camera 24 in the inverted position (the door facing the earth's surface) so that gravity urges the film cartridge 10 downwardly. The user opens the door 28 and the film cartridge 10 drops downwardly until the lip portion 22 of the cartridge 10 engages the retainer 32 which causes it to stop and be maintained in this partially ejected position. It is to be noted that the groove 20 of the cartridge 10 is positioned adjacent the retainer 32 so that the cartridge 10 is uninhibited in its downwardly motion until contacted by the lip portion 22, and that in this partially ejected position the lower portion of the film cartridge 10 is positioned out of the camera body 26.

Referring now to FIG. 3, the user then manually pulls the film cartridge 10 downwardly so that the biasing of the spring 36 is overcome for permitting the retainer 32 to forwardly pivot through the notched-out portion 35 and out of the chamber 30 so that the film cartridge 10 is totally ejected from the chamber 30. Once the film cartridge 10 is entirely out of the chamber 30, the spring 36 causes the retainer 32 to pivot backwardly until it contacts the stop 38 where it comes to rest. It is instructive to note that the forwardly pivoting also causes the arm 44 to move downwardly and disengage the latch portion 68. This causes the button 50 to be biased inwardly by the spring 56 which, in turn, causes the button 50 to contact the lever 62 for activating the reset mode of the rewind operation.

Figure 6:
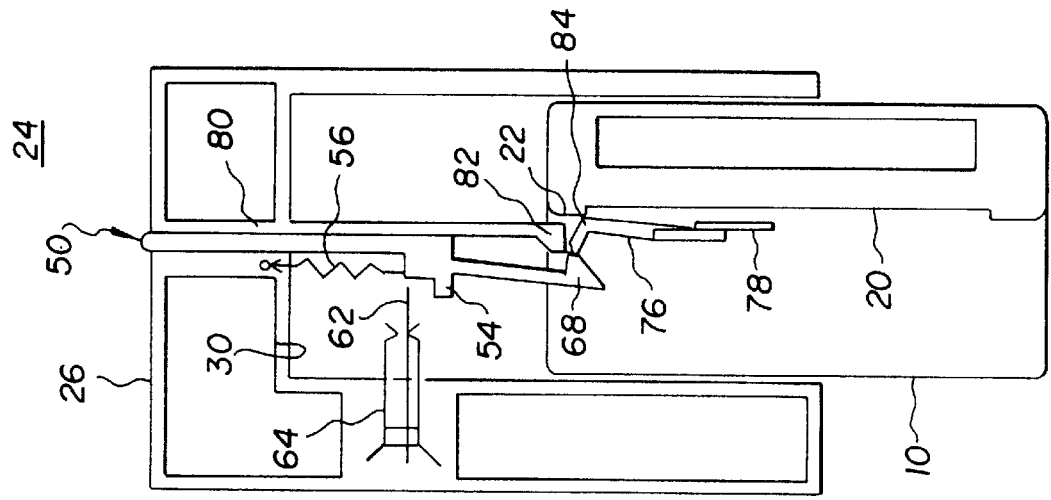
FIG. 6 is still another illustration of FIG. 4 illustrating the film cartridge being ejected.
Figure 5:
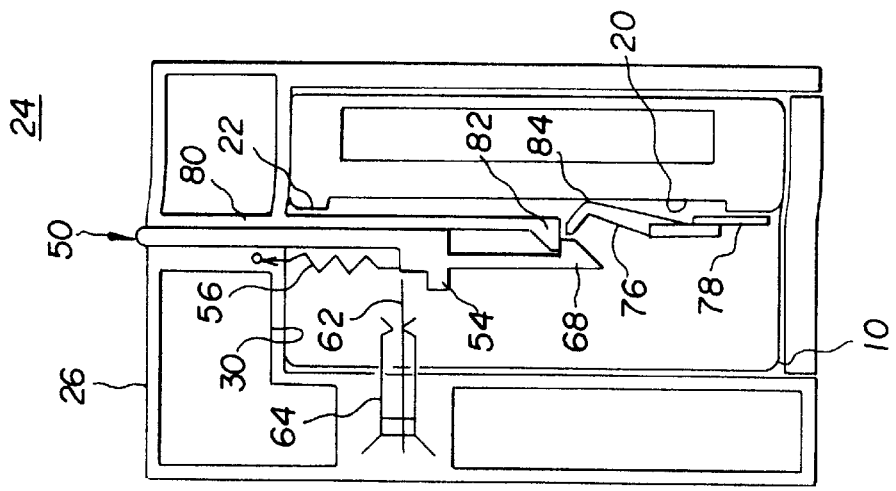
FIG. 5 is an illustration of FIG. 4 in the activation mode.
Figure 4:
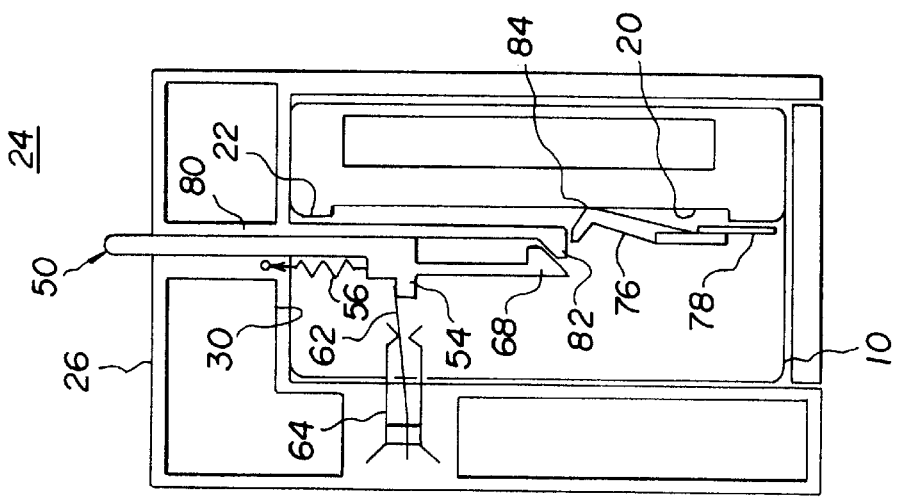
FIG. 4 is an alternative embodiment of the camera of the present invention in horizontal cross section illustrating the reset mode.

Referring to FIGS. 4, 5 and 6, alternative embodiments of the present invention are illustrated. This embodiment is substantially the same as the above-described embodiment except that an arcuate-shaped, resilient member 76 is substituted for the retainer 32 of the above-described embodiment and that the arm 44 and spring 36 of the above-described embodiment are eliminated. Referring now to FIG. 4, the resilient member 76 is structurally joined to the camera body 26 by a coupling 78 which is an extension of the camera body (the portion of the camera body having the extension is deleted in FIGS. 4–6 for clarity). A shaft 80 having a foot 82 extends into the interior of the camera body 26 for providing a means (the foot 82) to which the latch portion 68 may latch onto during activation of the rewind operation; the shaft 80 is integrally attached to the body 26 for structural support. In the reset mode of FIG. 4, the button 50 and switch 64 are in the same position as previously described in the above embodiment. The resilient member 76 projects into the chamber 30, and when the film cartridge 10 is inserted into the chamber 30, the lip portion 22 of the cartridge 10 contacts and forces an offset 84 of the resilient member 76 outwardly until it entirely passes by the offset 84. The offset 84 of the resilient member 76 then non-frictionally mates in the groove 20 of the cartridge 10 for permitting the cartridge 10 to be fully inserted into the chamber 30.

Referring now to FIG. 5, after the images are captured, the rewind button 50 is depressed and the button 50 disengages the lever 62 for permitting it to go to the activation position. The latch portion 68 is resilient enough so that it slides over the foot 82, and when the user releases the button 50, the latch portion 68 engages the foot 82 for maintaining it there. Both the latch portion 68 and the foot 82 include beveled edges for assisting in the sliding of the latch portion 68 over the foot 82. The user inverts the camera 24 and opens the door 28 for permitting the cartridge 10 to slid out of the chamber 30. As it slides out of the chamber 30, the lip portion 22 of the cartridge 10 engages the offset 84 which maintains it in this partially ejected position.

Referring to FIG. 6, the user then manually pulls the cartridge 10 until it overcomes the resistance of the offset 84 which causes the offset 84 to flex outwardly from the lip portion 22 for permitting total ejection of the cartridge 10. This causes an end of the resilient member 84 to contact and push the latch portion 68 outwardly so that it disengages the foot 82 which permits the spring 56 to force the button back to the reset position (FIG. 4).

In addition to the resetting upon withdrawal of the film cartridge 10, the camera is also reset upon insertion of the film cartridge 10. In this regard, when the film cartridge 10 is inserted into the chamber 30, the lip portion 22 engages the offset 84 of the resilient member 76 for forcing the latch portion 68 outwardly and, consequently, over the foot 82. The spring 56 then forces the button 50 inwardly so that the middle portion 54 contacts the lever 62 for putting the switch 64 in the reset position.

The invention has been described with reference to a preferred embodiment. However, it will be appreciated that variations and modifications can be effected by a person of ordinary skill in the art without departing from the scope of the invention.

Parts List:

10 film cartridge
12 housing
14 lip
16 spool
18 opening
20 groove
22 inclined portion
23 inclined portion
24 camera
26 camera body
28 hinged door
30 cartridge chamber
32 retainer
34 pin
35 notched-out portion
36 spring
38 stop
40 leading end portion
42 training end portion
44 arm
46 beveled end portion
48 pin
50 activation button or operator
52 elongated end portion
53 hole
54 stepped or two-tiered middle portion
56 spring
58 tier
60 tier
62 lever
64 electrical switch
66 button
68 latch portion
70 beveled edge
72 cpu
74 motors
76 resilient member
78 coupling
80 shaft
82 foot
84 offset

I claim:

1. A camera for use with a film cartridge which camera automatically resets a camera operation upon unloading of the film cartridge, the camera comprising:

(a) a camera body for forming a protective enclosure;

(b) a retainer disposed in said camera body that moves to a passive position upon unloading of the film cartridge for permitting the film cartridge to be loaded in said camera body, and that moves to an active position that engages the film cartridge during unloading of the film cartridge;

(c) an electrical switch disposed in said camera body having a first state that activates the camera operation and a second state that resets the camera operation; and (d) a manually depressible device that moves said electrical switch to the activation position for activating the camera operation, and during unloading of the film cartridge, said retainer is engaged by the film cartridge for moving said retainer to the active position, which consequently causes said manually depressible device to move said electrical switch to the second state for resetting the camera operation upon unloading of the film cartridge;

wherein said retainer either engages or disengages said manually depressible device by said retainer abutting a lip portion of the film cartridge.

2. The camera as in claim 1, wherein said retainer includes an arcuate-shaped body for forming a projection which projects into a groove of the film cartridge.

3. The camera as in claim 2, wherein said retainer is resilient for permitting the film cartridge to pass thereunder at a predetermined force, and for retaining the film cartridge when the film cartridge is urged out of the camera housing only by gravity.

4. The camera as in claim 1, wherein said retainer includes an arcuate-shaped portion that extends away from the film cartridge for permitting the film cartridge to pass thereunder.

5. The camera as in claim 4, wherein said retainer is resilient for permitting said retainer to pass thereunder.

6. The camera as in claim 5 further comprising a resilient member attached to said retainer for biasing said retainer in a predetermined direction.

* * * * *